Dec. 27, 1927.
G. MROZEK
1,654,185
COFFEE POT ATTACHMENT
Filed Jan. 21, 1927
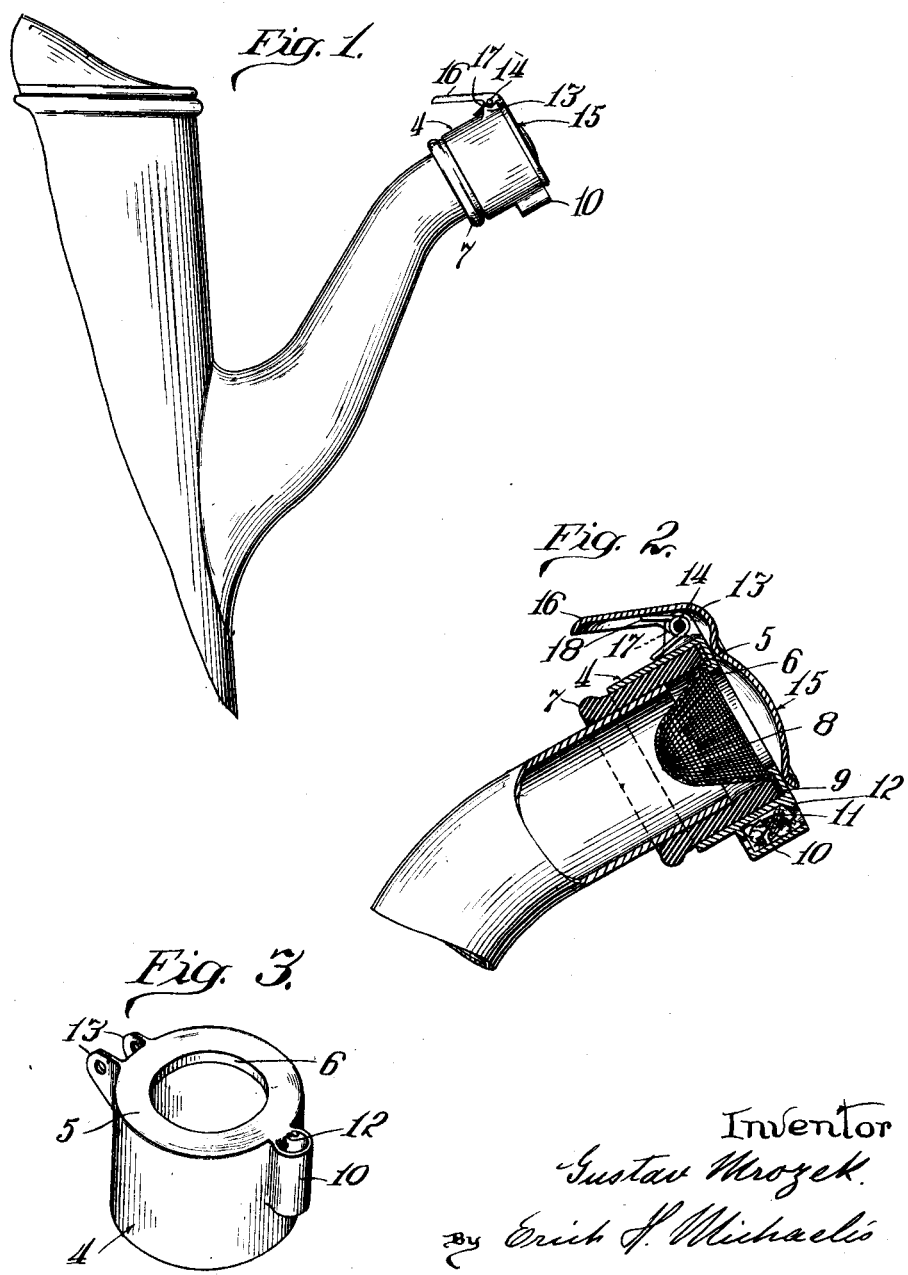
Inventor
Gustav Mrozek.
By Erich F. Michaelis
Attorney Patented Dec. 27, 1927.

1,654,185

UNITED STATES PATENT OFFICE.

GUSTAV MROZEK, OF CHICAGO, ILLINOIS.

COFFEEPOT ATTACHMENT.

Application filed January 21, 1927. Serial No. 162,425.

The invention consists in an attachment adapted to be removably fastened to the snout of a coffee pot or the like and which serves the following purposes:

1. It prevents the coffee or the like, which after being poured, will collect at the lip of the snout and drip from there on to the table cloth, from doing so.

2. The attachment will serve as a strainer, and

3. It will serve as a lid keeping the cold air out and thereby preserving the heat of the coffee or the like.

The drawings accompanying this application show a preferred embodiment of the invention. It is, however, to be understood that said invention is not to be limited or restricted to the exact construction shown in the drawings and described in the following specification, but that such changes and alterations may be made as fall into the scope of the claims appended hereto.

Fig. 1 shows the front portion of the coffee pot or the like to which the attachment, forming the subject matter of this invention, is attached.

Fig. 2 is a vertical section through the outer part of the pouring spout of said pot, on which the attachment is fastened.

Fig. 3 is a perspective detail drawing of the body of the attachment.

The attachment has a substantially cylindrical body 4 made of any suitable material preferably, however, said body may be formed by pressing sheet metal into the desired shape. Said body has a ring portion 5 extending to the cylindrical portion 4 at right angles and bent inwardly forming a rim 6 extending for a short way parallel to the cylindrical wall 4. A cylindrically shaped rubber lining 7 fits snugly into the body 4. A strainer 8 has a rim portion 9. The strainer is adapted to be inserted into the body 4, whereby then the rim portion 9 of the strainer 8 will rest against the circular portion 5 of the body. After the strainer has been inserted into this position the rubber lining 7 will be forced into the cylindrical wall 4 and shoved in all of the way until the lining will abut the rim portion 9 of the strainer thereby holding said strainer in position. The apparatus could now be pushed onto the pouring end of the snout of the coffee pot and could serve for straining the coffee and preventing the coffee grounds from falling out of said pot so that the one purpose of the invention would be fulfilled.

On the one side of the body 4, namely on that side, which will as shown in Fig. 1 be the lowermost portion of the attachment, when the latter is in working position, a shell 10 is formed. This shell is adapted to receive moisture absorbing material 11, such as cotton or a small piece of sponge or the like. This material may easily be inserted and removed by means of a nail or the like. In order to facilitate the collection of coffee or the like on the spot where it will be easily conducted into the shell 10 and on to the absorbing material, a bead 12 is provided on the edge formed by the cylindrical portion 4 and the rim portion 5 of the body.

It will be clear that thereby the second object of the invention is also fulfilled.

On a place diametrically opposite to the shell 10 the body 4 is provided with two ears or lugs 13. A hinge pin 14 extends through these two ears. A cover 15 fits over the opening of the attachment. This lid is dish shaped and touches, as shown in Fig. 2, the rim part 5, closing the opening and preventing the cold air from entering into the pot. Integrally with the cover 15 a thumb piece 16 is formed, and the hinge pin 14 extends through the side portions 17 integrally formed into said finger piece. A spring 18 is laid around the hinge pin 14 and is located between the two lugs 13. It abuts with one of its ends the body 4 and with the other end against the inner side of the finger piece urging the latter away from the body and thereby forcing the lid 15 into closing position,

What I claim as new and desire to secure by Letters Patent is:

1. In a device of the class described a cylindrical body adapted to be removably fastened to the pouring end of a coffee pot, a shell on the lowermost side of said body, and a bead formed on said lowermost lip portion of the body adapted to facilitate the collection of liquid adhering to the body.

2. In a device of the class described a cylindrical body adapted to be fastened to the pouring end of a coffee pot, and a lid hingedly fastened to said body and adapted to close the pouring opening of the coffee pot.

3. In a device of the class described a cylindrical body adapted to be removably fastened to the pouring end of a coffee pot, a shell on said body, moisture absorbing material in said shell adapted to absorb liquid dripping from the lowermost lip of the body, a strainer inserted in said body and adapted to overlay the pouring opening and, a lid hingedly fastened to said body and adapted to close the said pouring opening.

4. In a device of the class described a cylindrical body, a strainer adapted to be inserted into said body, a cylindrical rubber lining adapted to be inserted into said body, and to hold the strainer in position, a shell on the lowermost side of said body adapted to receive liquid dripping from the lowermost lip of the body, moisture absorbing material in said shell, a lid hingedly connected to the body and adapted to close the pouring opening of the coffee pot and means for urging said lid into closing position.

In witness whereof I hereunto affix my signature.

GUSTAV MROZEK.